US010774239B2

(12) United States Patent
Laas et al.

(10) Patent No.: US 10,774,239 B2
(45) Date of Patent: *Sep. 15, 2020

(54) SCRATCH-RESISTANT TWO-COMPONENT POLYURETHANE COATINGS

(71) Applicant: Covestro Deutschland AG, Leverkusen (DE)

(72) Inventors: Hans-Josef Laas, Odenthal (DE); Tanja Hebestreit, Wipperfürth (DE); Jan Weikard, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 46 days.

This patent is subject to a terminal disclaimer.

(21) Appl. No.: 15/758,461

(22) PCT Filed: Sep. 7, 2016

(86) PCT No.: PCT/EP2016/071004
§ 371 (c)(1),
(2) Date: Mar. 8, 2018

(87) PCT Pub. No.: WO2017/042177
PCT Pub. Date: Mar. 16, 2017

(65) Prior Publication Data
US 2018/0244950 A1    Aug. 30, 2018

(30) Foreign Application Priority Data
Sep. 9, 2015    (EP) .................................... 15184421

(51) Int. Cl.
| | | |
|---|---|---|
| *C09D 175/04* | (2006.01) | |
| *C08G 18/08* | (2006.01) | |
| *C08G 18/22* | (2006.01) | |
| *C08G 18/28* | (2006.01) | |
| *C08G 18/62* | (2006.01) | |
| *C08G 18/72* | (2006.01) | |
| *C08G 18/73* | (2006.01) | |
| *C08G 18/78* | (2006.01) | |
| *C08G 18/79* | (2006.01) | |
| *C08G 18/80* | (2006.01) | |

(52) U.S. Cl.
CPC ....... *C09D 175/04* (2013.01); *C08G 18/0871* (2013.01); *C08G 18/222* (2013.01); *C08G 18/289* (2013.01); *C08G 18/6225* (2013.01); *C08G 18/725* (2013.01); *C08G 18/73* (2013.01); *C08G 18/7837* (2013.01); *C08G 18/792* (2013.01); *C08G 18/809* (2013.01)

(58) Field of Classification Search
CPC ............. C09D 175/04; C08G 18/6225; C08G 18/725; C08G 18/73; C08G 18/7837; C08G 18/792; C08G 18/809; C08G 18/0871; C08G 18/222; C08G 18/289
See application file for complete search history.

(56) References Cited

U.S. PATENT DOCUMENTS

| | | |
|---|---|---|
| 3,640,967 A | 2/1972 | König et al. |
| 3,769,318 A | 10/1973 | Windemuth et al. |
| 4,160,080 A | 7/1979 | König et al. |
| 4,663,377 A | 5/1987 | Hombach et al. |
| 4,837,359 A | 6/1989 | Woynar et al. |
| 4,960,848 A | 10/1990 | Scholl et al. |
| 4,994,541 A | 2/1991 | Dell et al. |
| 5,075,370 A | 12/1991 | Kubitza et al. |
| 5,076,958 A | 12/1991 | Pedain et al. |
| 5,252,696 A | 10/1993 | Laas et al. |
| 5,387,367 A | 2/1995 | Haeberle et al. |
| 5,387,642 A | 2/1995 | Blum et al. |
| 5,670,600 A | 9/1997 | Nienhaus et al. |
| 5,854,338 A | 12/1998 | Hovestadt et al. |
| 5,914,383 A | 6/1999 | Richter et al. |
| 6,090,939 A | 7/2000 | Richter et al. |
| 6,376,602 B1 | 4/2002 | Probst et al. |
| 6,426,414 B1 | 7/2002 | Laas et al. |
| 6,756,464 B2 | 6/2004 | Hofacker et al. |
| 6,765,111 B1 | 7/2004 | Pedain et al. |
| 6,767,958 B2 | 7/2004 | Laas et al. |
| 7,879,407 B2 | 2/2011 | Poppeq et al. |
| 7,956,209 B2 | 6/2011 | Laas et al. |
| 8,013,099 B2 | 9/2011 | Poppe et al. |
| 8,569,438 B2 | 10/2013 | Groenewolt et al. |
| 8,658,752 B2 | 2/2014 | Groenewolt et al. |
| 8,808,805 B2 | 8/2014 | Groenewolt et al. |
| 9,017,818 B2 | 4/2015 | Groenewolt |
| 9,353,210 B2 | 5/2016 | Laas et al. |

(Continued)

FOREIGN PATENT DOCUMENTS

| | | |
|---|---|---|
| CA | 1081389 A | 7/1980 |
| CA | 2101876 A1 | 2/1994 |

(Continued)

OTHER PUBLICATIONS

International Search Report for PCT/EP2016/071002 dated Nov. 23, 2016.
International Search Report for PCT/EP2016/071004 dated Nov. 23, 2016.
Written Opinion of the International Searching Authority for PCT/EP2016/071002 dated Nov. 23, 2016.
Written Opinion of the International Searching Authority for PCT/EP2016/071004 dated Nov. 23, 2016.
International Preliminary Report on Patentability for International Application No. PCT/EP2016/071004, dated Mar. 13, 2018.

*Primary Examiner* — Patrick D Niland

(74) *Attorney, Agent, or Firm* — Faegre Drinker Biddle & Reath LLP

(57) ABSTRACT

The invention relates to coating agents that contain thioallophanates, containing silane groups, as cross-linking agents and to the use of said coating agents to produce coatings, in particular clear coats for automobile painting.

15 Claims, No Drawings

(56) References Cited

U.S. PATENT DOCUMENTS

| | | |
|---|---|---|
| 9,371,469 B2 | 6/2016 | Groenewolt et al. |
| 9,644,111 B2 | 5/2017 | Hoffmann et al. |
| 9,777,190 B2 | 10/2017 | Groenewolt et al. |
| 10,179,830 B2 * | 1/2019 | Laas .................. C08G 18/7818 |
| 2001/0021746 A1 | 9/2001 | Nabavi et al. |
| 2003/0027921 A1 | 2/2003 | Speier et al. |
| 2011/0082273 A1 | 4/2011 | Laas et al. |
| 2012/0101210 A1 | 4/2012 | Nennemann et al. |
| 2016/0122583 A1 | 5/2016 | Groenewolt et al. |
| 2016/0280836 A1 | 9/2016 | Ji et al. |
| 2018/0112026 A1 * | 4/2018 | Laas .................. C08G 18/6229 |

FOREIGN PATENT DOCUMENTS

| | | |
|---|---|---|
| CA | 2244486 A1 | 2/1999 |
| DE | 1670666 A1 | 7/1971 |
| DE | 2356768 B1 | 1/1975 |
| DE | 1770245 B2 | 9/1975 |
| DE | 3700209 A1 | 7/1988 |
| DE | 3900053 A1 | 7/1990 |
| EP | 0000194 A1 | 1/1979 |
| EP | 0206059 A2 | 12/1986 |
| EP | 0330966 A2 | 9/1989 |
| EP | 0336205 A2 | 10/1989 |
| EP | 0339396 A1 | 11/1989 |
| EP | 0358979 A2 | 3/1990 |
| EP | 0469389 A1 | 2/1992 |
| EP | 0486881 A2 | 5/1992 |
| EP | 0496205 A1 | 7/1992 |
| EP | 0540985 A1 | 5/1993 |
| EP | 0557844 A1 | 9/1993 |
| EP | 0583728 A1 | 2/1994 |
| EP | 0649866 A1 | 4/1995 |
| EP | 0798299 A1 | 10/1997 |
| EP | 0872499 A1 | 10/1998 |
| EP | 0896009 A1 | 2/1999 |
| EP | 0949284 A1 | 10/1999 |
| EP | 0959087 A1 | 11/1999 |
| EP | 0962455 A1 | 12/1999 |
| EP | 1273640 A2 | 1/2003 |
| EP | 2014692 A2 | 1/2009 |
| EP | 2046861 A1 | 4/2009 |
| EP | 2236531 A1 | 10/2010 |
| EP | 2305691 A1 | 4/2011 |
| GB | 994890 A | 6/1965 |
| GB | 1145952 A | 3/1969 |
| WO | WO-9403511 A1 | 2/1994 |
| WO | WO-9420559 A1 | 9/1994 |
| WO | WO-9428043 A1 | 12/1994 |
| WO | WO-9502005 A1 | 1/1995 |
| WO | WO-9731960 A1 | 9/1997 |
| WO | WO-0188006 A1 | 11/2001 |
| WO | WO-02059224 A1 | 8/2002 |
| WO | WO-2005047357 A2 | 5/2005 |
| WO | WO-2006042658 A1 | 4/2006 |
| WO | WO-2007033786 A1 | 3/2007 |
| WO | WO-2008013731 A1 | 1/2008 |
| WO | WO-2008074489 A1 | 6/2008 |
| WO | WO-2008074490 A1 | 6/2008 |
| WO | WO-2009077180 A1 | 6/2009 |
| WO | WO-2009156148 A1 | 12/2009 |
| WO | WO-2010149236 A1 | 12/2010 |
| WO | WO-2012098014 A1 | 7/2012 |
| WO | WO-2012168079 A1 | 12/2012 |
| WO | WO-2014016019 A1 | 1/2014 |
| WO | WO-2014037265 A1 | 3/2014 |
| WO | WO-2014086530 A1 | 6/2014 |
| WO | WO-2015035673 A1 | 3/2015 |

* cited by examiner

SCRATCH-RESISTANT TWO-COMPONENT POLYURETHANE COATINGS

CROSS-REFERENCE TO RELATED APPLICATIONS

This application is a national stage application (under 35 U.S.C. § 371) of PCT/EP2016/071004, filed Sep. 7, 2016, which claims benefit of European Application No. 15184421.4, filed Sep. 9, 2015, both of which are incorporated herein by reference in their entirety.

The invention relates to coating compositions which comprise thioallophanates containing silane groups as crosslinking agents, and to the use of these coating compositions for producing coatings, more particularly clearcoats for automotive finishing.

Since they were introduced into automotive OEM finishing in the middle of the 1980s, two-component polyurethane (2K PU) clearcoats have gained steadily in market share, by virtue of their superior technological properties in comparison to conventional acrylate/melamine resin coating systems (thermosetting acrylics, TSA coatings).

The present-day 2K PU clearcoats, which generally contain hydroxy-functional poly(meth)acrylate resins which are crosslinked with aliphatic polyisocyanates, especially derivatives of hexamethylene diisocyanate (HDI), optionally in combination with polyisocyanates based on the cycloaliphatic isophorone diisocyanate (IPDI), afford coatings with high mechanical and chemical resistance and very good optical qualities.

In spite of the high quality level already achieved by the 2K PU coatings, the market has an ongoing interest in coating systems having ever further-improved properties, especially an improved scratch resistance.

One way of increasing the scratch resistance of polyurethane coatings is to use polyisocyanate crosslinkers containing silane groups. Polyisocyanate mixtures containing alkoxysilane groups have been known for some considerable time. Products of this kind, which as well as the isocyanate group contain a second reactive structure, in other words a structure capable of crosslinking, have been used in the past in polyurethane systems for various applications with the aim of obtaining specific properties, such as, for example, to improve the adhesion, chemical resistance, and scratch resistance of coatings.

For example, to improve the scratch resistance of solvent-borne thermosetting 2K PU automotive clearcoat and topcoat materials, EP-A1 273 640 proposed reaction products of aliphatic and/or cycloaliphatic polyisocyanates with N,N-bis(trialkoxysilylpropyl)amines as a crosslinker component.

Further publications describe coating compositions for production of weather-stable, scratch-resistant clearcoat films for OEM finishing and automotive refinishing, in which crosslinker components used are reaction products of aliphatic and/or cycloaliphatic polyisocyanates with molar deficiency amounts of alkoxysilanes that are reactive toward isocyanate groups. Suitable reactive alkoxysilanes mentioned are, in particular, specific mixtures of bis(alkoxysilylalkyl)amines with N-alkylmono(alkoxysilylalkyl)amines (e.g. WO 2008/074489, WO 2008/074490, WO 2010/149236, and WO 2014/086530), and also mercaptoalkylalkoxysilanes and/or secondary alkoxysilylalkylamines (e.g. WO 2009/156148).

Common to all of these polyisocyanate mixtures containing silane groups is that they are prepared by proportional reaction of unmodified polyisocyanates with organofunctional silanes that contain groups reactive toward isocyanate groups, examples being mercapto-functional silanes, primary aminoalkylsilanes, secondary N-alkyl-substituted aminoalkylsilanes, or alkoxysilane-functional aspartic esters.

Any such reaction, however, leads inevitably to a reduction in the average isocyanate functionality, based on that of the starting polyisocyanates used, this effect becoming greater as the target silane content in the reaction product goes up. In practice in the aforementioned applications, such as in clearcoat materials, for example, polyisocyanate crosslinkers with extremely high isocyanate functionality are specifically desired, however, in order to achieve high network density.

Furthermore, as the degree of modification—that is, the silane group content—goes up, there is also a drastic increase in the viscosity of the products, owing to the thiourethane groups and, in particular, urea groups that are introduced into the molecule; for this reason, the silane group-containing polyisocyanates known to date can generally only be used in dissolved form, using considerable quantities of organic solvents.

An exception in this regard is represented by the polyisocyanates containing allophanate groups and silane groups that are described in EP-A2 014 692 and EP-A2 305 691, that are obtainable by reaction of hydroxyurethanes and/or hydroxyamides containing silane groups with excess amounts of monomeric diisocyanates; in spite of high isocyanate functionalities and high silane contents, these polyisocyanates have comparatively low viscosities. However, preparing these specific silane-functional polyisocyanates is very costly and inconvenient, and involves poor reproducibility, owing to the low stability of the hydroxyurethane and/or hydroxyamide intermediates that have formed from aminoalkylsilanes with cyclic carbonates and/or lactones, respectively.

It was an object of the present invention, therefore, to provide new coating compositions based on polyisocyanates containing silane groups, and curing to give highly scratch-resistant coatings. The polyisocyanate crosslinkers containing silane groups that are employed in the coating compositions ought to be able to be prepared reliably and reproducibly in a simple process and ought in particular to have low viscosities even at high silane group contents.

This object has been achieved with the provision of the coating compositions of the invention, which are described in more detail below.

The present invention provides nonaqueous coating compositions comprising

A) at least one polyisocyanate component,
B) at least one hydroxy-functional binder component,
C) at least one catalyst for the crosslinking of silane groups, and
D) optionally further auxiliaries and additives, where the polyisocyanate component A) comprises at least one thioallophanate containing silane groups, of the general formula (I),

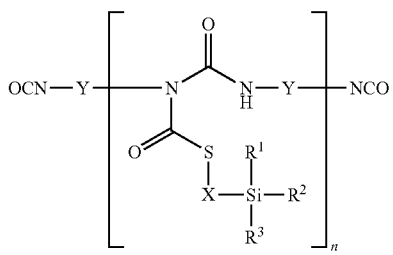

(I)

in which

R¹, R² and R³ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen, X is a linear or branched organic radical having at least 2 carbon atoms, Y is a linear or branched, aliphatic or cycloaliphatic, an araliphatic or aromatic radical having up to 18 carbon atoms and n is an integer from 1 to 20.

The invention also provides for the use of these coating compositions for producing polyurethane coatings, more particularly for producing clearcoats for automotive finishing.

The polyisocyanate component A) of the coating compositions of the invention comprises at least one thioallophanate containing silane groups, of the general formula (I)

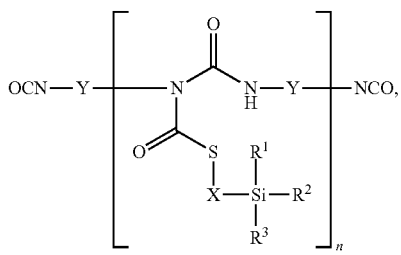

(I)

in which

R¹, R² and R³ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen, X is a linear or branched organic radical having at least 2 carbon atoms, Y is a linear or branched, aliphatic or cycloaliphatic, an araliphatic or aromatic radical having up to 18 carbon atoms and n is an integer from 1 to 20.

In one preferred embodiment of the present invention, the polyisocyanate component A) of the coating compositions of the invention consists of at least one thioallophanate containing silane groups, of the general formula (I).

These thioallophanates containing silane groups are prepared by reacting a) at least one monomeric diisocyanate of the general formula (II)

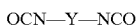 (II), in which Y is a linear or branched, aliphatic or cycloaliphatic, an araliphatic or aromatic radical having up to 18 carbon atoms, with b) mercaptosilanes of the general formula (III)

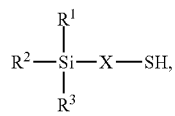 (III)

in which

R¹, R², R³ and X are as defined above, in an equivalent ratio of isocyanate groups to mercapto groups of 2:1 to 40:1.

Suitable starting compounds a) for preparing the thioallophanates B) containing the silane groups are any desired diisocyanates having aliphatically, cycloaliphatically, araliphatically and/or aromatically bonded isocyanate groups, which may be prepared by any desired methods, as for example by phosgenation or by a phosgene-free route, by means of urethane cleavage, for example.

Suitable diisocyanates are, for example, those of the general formula (II)

 (II), in which Y is a linear or branched, aliphatic or cycloaliphatic radical having up to 18 carbon atoms, preferably 4 to 18 carbon atoms, or an optionally substituted aromatic or araliphatic radical having up to 18 carbon atoms, preferably 5 to 18 carbon atoms, such as, for example, 1,4-diisocyanatobutane, 1,5-diisocyanatopentane (PDI), 1,6-diisocyanatohexane (HDI), 1,5-diisocyanato-2,2-dimethylpentane, 2,2,4- and 2,4,4-trimethyl-1,6-diisocyanatohexane, 1,8-diisocyanatooctane, 1,9-diisocyanatononane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H₁₂-MDI), 1,3- and 1,4-bis(isocyanatomethyl)cyclohexane, 4,4'-diisocyanato-3,3'-dimethyldicyclohexylmethane, 4,4' diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis-(isocyanatomethyl)benzene, 1,3- and 1,4-bis(1-isocyanato-1-methylethyl)benzene (TMXDI), bis(4-(1-isocyanato-1-methylethyl)phenyl) carbonate, 1,3- and 1,4-phenylene diisocyanate, 2,4- and 2,6-tolylene diisocyanate, and any desired mixtures of these isomers, diphenylmethane 2,4'- and/or 4,4'-diisocyanate and naphthylene 1,5-diisocyanate, and any desired mixtures of such diisocyanates. Further diisocyanates which are likewise suitable are found, furthermore, for example, in Justus Liebigs Annalen der Chemie Volume 562 (1949) pp. 75-136.

Particularly preferred as starting component a) are diisocyanates of the general formula (II), in which Y is a linear or branched, aliphatic or cycloaliphatic radical having 5 to 13 carbon atoms.

Especially preferred starting components a) for the method of the invention are 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane or any desired mixtures of these diisocyanates.

The starting components b) for preparing the thioallophanates containing silane groups are any desired mercaptosilanes of the general formula (III)

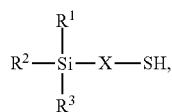

in which
$R^1$, $R^2$ and $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen, and
X is a linear or branched organic radical having at least 2 carbon atoms.

Examples of suitable mercaptosilanes b) are 2-mercaptoethyltrimethylsilane, 2-mercaptoethylmethyldimethoxysilane, 2-mercaptoethyltrimethoxysilane, 2-mercaptoethyltriethoxysilane, 3-mercaptopropylmethyldimethoxysilane, 3-mercaptopropyldimethylmethoxysilane, 3-mercaptopropyltrimethoxysilane, 3-mercaptopropylmethyldiethoxysilane, 3-mercaptopropyltriethoxysilane, 3-mercaptopropylethyldimethoxysilane, 3-mercaptopropylethyldiethoxysilane and/or 4-mercaptobutyltrimethoxysilane.

Preferred mercaptosilanes b) for preparing the thioallophanates containing silane groups are those of the general formula (III) in which
$R^1$, $R^2$ and $R^3$ are identical or different radicals and are each a saturated, linear or branched, aliphatic or cycloaliphatic radical having up to 6 carbon atoms, and may optionally contain up to 3 oxygen atoms, and
X is a linear or branched alkylene radical having 2 to 10 carbon atoms.

Particularly preferred mercaptosilanes b) are those of the general formula (III) in which
$R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is such an alkoxy radical, and
X is a propylene radical ($—CH_2—CH_2—CH_2—$).

Especially preferred mercaptosilanes b) are those of the general formula (III) in which
$R^1$, $R^2$ and $R^3$ are identical or different radicals and are each methyl, methoxy or ethoxy, with the proviso that at least one of the radicals $R^1$, $R^2$ and $R^3$ is a methoxy or ethoxy radical, and
X is a propylene radical ($—CH_2—CH_2—CH_2—$).

For preparing the thioallophanates containing silane groups, the diisocyanates a) are reacted with the mercaptosilanes b) at temperatures from 20 to 200° C., preferably 40 to 160° C., observing an equivalents ratio of isocyanate groups to mercapto groups of 2:1 to 40:1, preferably of 4:1 to 30:1, particularly preferably 6:1 to 20:1, to give thioallophanates.

The reaction can be carried out without catalyst, as a thermally induced allophanatization. Preferably, however, suitable catalysts are used for accelerating the allophanatization reaction. These are the customary known allophanatization catalysts, examples being metal carboxylates, metal chelates or tertiary amines of the type described in GB-A0 994 890, or alkylating agents of the type described in U.S. Pat. No. 3,769,318, or strong acids as described by way of example in EP-A0 000 194.

Suitable allophanatization catalysts are, in particular zinc compounds, such as zinc(II) stearate, zinc(II) n-octanoate, zinc(II) 2-ethyl-1-hexanoate, zinc(II) naphthenate or zinc(II) acetylacetonate, tin compounds, such as tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate or dioctyltin diacetate, zirconium compounds, such as zirconium(IV) 2-ethyl-1-hexanoate, zirconium(IV) neodecanoate, zirconium(IV) naphthenate or zirconium(IV) acetylacetonate, aluminium tri(ethylacetoacetate), iron(III) chloride, potassium octoate, manganese, cobalt or nickel compounds, and also strong acids, such as trifluoroacetic acid, sulphuric acid, hydrogen chloride, hydrogen bromide, phosphoric acid or perchloric acid, for example, or any desired mixtures of these catalysts.

Also suitable catalysts, albeit less preferably, for preparing the thioallophanates containing silane groups are compounds which as well as the allophanatization reaction also catalyze the trimerization of isocyanate groups to form isocyanurate structures. Catalysts of this kind are described for example in EP-A0 649 866 at page 4, line 7 to page 5, line 15.

Preferred catalysts for preparing the thioallophanates containing silane groups are zinc and/or zirconium compounds of the aforementioned kind. Especially preferred is the use of zinc(II) n-octanoate, zinc(II) 2-ethyl-1-hexanoate and/or zinc(II) stearate, zirconium(IV) n-octanoate, zirconium(IV) 2-ethyl-1-hexanoate and/or zirconium(IV) neodecanoate.

In the preparation of the thioallophanates containing silane groups, these catalysts are employed, if at all, in an amount of 0.001 to 5 wt %, preferably 0.005 to 1 wt %, based on the total weight of the reactants a) and b), and may be added both before the start of reaction and at any point during the reaction.

The preparation of the thioallophanates containing silane groups is preferably carried out without solvent. Optionally, however, it is also possible to use suitable solvents which are inert relative to the reactive groups of the starting components. Suitable solvents are, for example, the customary paint solvents that are known per se such as ethyl acetate, butyl acetate, ethylene glycol monomethyl or monoethyl ether acetate, 1-methoxyprop-2-yl acetate (MPA), 3-methoxy-n-butyl acetate, acetone, 2-butanone, 4-methyl-2-pentanone, cyclohexanone, toluene, xylene, chlorobenzene, white spirit, more highly substituted aromatics, of the kind available commercially, for example, under the names solvent naphtha, Solvesso®, Isopar®, Nappar®, Varsole® (ExxonMobil Chemical Central Europe, Cologne, Germany) and Shellsol® (Shell Deutschland Oil GmbH, Hamburg, Germany), and also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents. These solvents or solvent mixtures preferably include a water content of at most 1.0 wt %, more preferably at most 0.5 wt %, based on solvent used.

In one possible embodiment, during the preparation of the thioallophanates containing silane groups, the starting diisocyanate a) or a mixture of different starting diisocyanates a) is introduced optionally under inert gas, such as nitrogen, for example, and optionally in the presence of a suitable solvent of the stated kind, at a temperature between 20 and 100° C. Subsequently the mercaptosilane b) or a mixture of different mercaptosilanes is added in the amount stated above, and the reaction temperature for the thiourethanization is adjusted optionally by an appropriate measure (heating or cooling) to a temperature of 30 to 120° C., preferably of 50 to 100° C. Following the thiourethanization reaction, i.e., when the NCO content reached is that corresponding theoretically to complete conversion of isocyanate groups and mercapto groups, the thioallophanatization may be started, for example, without addition of catalyst, by heating of the reaction mixture to a temperature of 120 to 200° C. Preferably, however, suitable catalysts of the above-stated kind are employed in order to accelerate the thioallophanatization reaction, in which case, depending on the nature and amount of the catalyst used, temperatures in the range from 60 to 140° C., preferably 70 to 120° C., are sufficient for implementing the reaction.

In another possible embodiment of the method for producing the thioallophanates containing silane groups, the catalyst for optional accompanying use is admixed either to the diisocyanate component a) and/or to the silane component b) even before the start of the actual reaction. In this case the thiourethane groups formed as intermediates undergo spontaneous further reaction to give the desired thioallophanate structure. In this kind of one-stage reaction regime, the starting diisocyanates a), optionally containing the catalyst, are introduced, optionally under inert gas—such as nitrogen, for example—and optionally in the presence of a suitable solvent of the stated type, in general at temperatures optimum for the thioallophanatization, in the range from 60 to 140° C., preferably 70 to 120° C., and are reacted with the silane component b), optionally containing the catalyst.

An alternative option is to add the catalyst to the reaction mixture at any desired point in time during the thiourethanization reaction. In the case of this embodiment of the process for preparing the thioallophanates containing silane groups, the temperature set for the pure thiourethanization reaction, which proceeds before the addition of catalyst, is generally in the range from 30 to 120° C., preferably from 50 to 100° C. Following addition of a suitable catalyst, finally, the thioallophanatization reaction is carried out at temperatures of 60 to 140° C., preferably of 70 to 120° C.

In the case of the preparation of the thioallophanates containing silane groups, the course of the reaction may be monitored by, for example, titrimetic determination of the NCO content. When the target NCO content has been reached, preferably when the degree of thioallophanatization (i.e., the percentage fraction, as computable from the NCO content, of the thiourethane groups which have formed as intermediates from the mercapto groups of component b) and have undergone reaction to form thioallophanate groups) of the reaction mixture is at least 70%, more preferably at least 90%, and very preferably after complete thioallophanatization, the reaction is discontinued. In the case of a purely thermal reaction regime, this may be accomplished, for example, by cooling the reaction mixture to room temperature. In the case of the preferred accompanying use of a thioallophanatization catalyst of the type stated, however, the reaction is generally stopped by addition of suitable catalyst poisons, examples being acyl chlorides, such as benzoyl chloride or isophthaloyl dichloride.

The reaction mixture is preferably then freed by thin-film distillation under a high vacuum, as for example at a pressure below 1.0 mbar, preferably below 0.5 mbar, more preferably below 0.2 mbar, under very gentle conditions, as for example at a temperature of 100 to 200° C., preferably of 120 to 180° C., from volatile constituents (excess monomeric diisocyanates, solvents optionally used, and, when no catalyst poison is being used, any active catalyst).

The distillates obtained, which as well as the unreacted monomeric starting diisocyanates, comprise any solvents used, where no catalyst poison is used, any active catalyst, can be used readily for renewed oligomerization.

In another embodiment of the process for preparing the thioallophanates containing silane groups, the stated volatile constituents are removed from the oligomerization product by extraction with suitable solvents that are inert towards isocyanate groups, examples being aliphatic or cycloaliphatic hydrocarbons such as pentane, hexane, heptane, cyclopentane or cyclohexane.

Irrespective of the type of working up, the resulting products are clear, virtually colorless thioallophanate polyisocyanates, with color numbers generally of less than 120 APHA, preferably of below 80 APHA, more preferably of below 60 APHA, and with an NCO content of 2.0 to 18.0 wt %, preferably 7.0 to 17.0 wt %, more preferably 10.0 to 16.0 wt %. The average NCO functionality, depending on the degree of conversion and thioallophanatization catalyst used, is generally from 1.8 to 3.0, preferably from 1.8 to 2.5, more preferably from 1.9 to 2.1.

Besides the thioallophanate polyisocyanates, the polyisocyanate component A) may optionally further comprise polyisocyanates having aliphatically, cycloaliphatically, araliphatically and/or aromatically bonded isocyanate groups, which may optionally also already have silane groups. These further polyisocyanates are, in particular, the known paint isocyanates with uretdione, isocyanurate, iminooxadiazinedione, urethane, allophanate, biuret and/or oxadiazinetrione structure, as described by way of example in Laas et al., *J. Prakt. Chem.* 336, 1994, 185-200, in DE-A1 670 666, DE A3 700 209, DE-A3 900 053, EP-A0 330 966, EP-A0 336 205, EP-A0 339 396 and EP-A0 798 299, and also reaction products of such polyisocyanates with compounds that contain silane groups and are reactive towards isocyanate groups, as described for example in EP-A1 273 640, WO 2014/086530 or WO 2009/156148.

Preferred further polyisocyanates which may be present optionally in the polyisocyanate component A) in addition to the thioallophanates containing silane groups are those of the type stated having exclusively aliphatically and/or cycloaliphatically bonded isocyanate groups, more particularly those based on PDI, HDI and/or IPDI.

If at all, in the coating compositions of the invention, these further polyisocyanates are used in the polyisocyanate component A) in amounts of up to 70 wt %, preferably up to 60 wt %, more preferably up to 50 wt %, based on the total amount of the polyisocyanate component A), consisting of at least one thioallophanate containing silane groups and optionally of further polyisocyanates.

In the blends which are present when further polyisocyanates of the stated kind are used accompanyingly as polyisocyanate components A), the very low viscosity of the thioallophanate polyisocyanates containing silane groups causes them to take on the role of a reactive diluent for the paint polyisocyanates, which are generally of higher viscosity. Relative to the existing, prior-art silane-functional polyisocyanates, for comparable silane contents, these blends of thioallophanate polyisocyanates containing silane groups with other polyisocyanates exhibit the advantage of considerably higher isocyanate contents and isocyanate functionalities in conjunction with much lower viscosities.

The coating compositions of the invention comprise as binder component B) any desired polyols which carry at least two hydroxyl groups. Suitable binder components B) are, for example, the customary polyhydroxyl compounds that are known from polyurethane chemistry, such as, for example, polyester polyols, polyether polyols, polycarbonate polyols and/or polyacrylate polyols, or any desired blends of such polyols.

Suitable polyester polyols B) are, for example, those with an average molecular weight, calculable from functionality and hydroxyl number, of 200 to 3000, preferably of 250 to 2500, having a hydroxyl group content of 1 to 21 wt %, preferably 2 to 18 wt %, of the kind preparable in a manner known per se by reaction of polyhydric alcohols with deficit amounts of polybasic carboxylic acids, corresponding carboxylic anhydrides, corresponding polycarboxylic esters of lower alcohols, or lactones.

Polyhydric alcohols suitable for preparing these polyester polyols are, in particular, those of the molecular weight range 62 to 400, such as, for example, 1,2-ethanediol, 1,2- and 1,3-propanediol, the isomeric butanediols, pentanediols, hexanediols, heptanediols and octanediols, 1,2- and 1,4-cyclohexanediol, 1,4-cyclohexanedimethanol, 4,4'-(1-methylethylidene)biscyclohexanol, 1,2,3-propanetriol, 1,1,1-trimethylolethane, 1,2,6-hexanetriol, 1,1,1-trimethylolpropane, 2,2-bis(hydroxymethyl)-1,3-propanediol or 1,3,5-tris(2-hydroxyethyl)isocyanurate.

The acids or acid derivatives used for preparing the polyester polyols B) may be aliphatic, cycloaliphatic and/or heteroaromatic in nature and may optionally be substituted, by halogen atoms, for example, and/or unsaturated. Examples of suitable acids are, for example, polybasic carboxylic acids of the molecular weight range 118 to 300 or derivatives thereof such as, for example, succinic acid, adipic acid, sebacic acid, phthalic acid, isophthalic acid, trimellitic acid, phthalic anhydride, tetrahydrophthalic acid, maleic acid, maleic anhydride, dimeric and trimeric fatty acids, dimethyl terephthalate and bisglycol terephthalate.

For preparing the polyester polyols B) it is also possible to use any desired mixtures of these exemplified starting compounds.

Suitable polyester polyols B) are also those of the kind preparable in a conventional way from lactones and simple polyhydric alcohols, such as those exemplified above, for example, as starter molecules, with ring opening. Examples of suitable lactones for preparing these polyester polyols are β-propiolactone, γ-butyrolactone, γ- and δ-valerolactone, ε-caprolactone, 3,5,5- and 3,3,5-trimethylcaprolactone or any desired mixtures of such lactones.

The preparation of these lactone polyesters is accomplished generally in the presence of catalysts, for example Lewis or Brønsted acids, organotin or organotitanium compounds, at temperatures of 20 to 200° C., preferably 50 to 160° C.

Suitable polyether polyols B) are, for example, those of an average molecular weight, calculable from functionality and hydroxyl number, of 200 to 6000, preferably 250 to 4000, having a hydroxyl group content of 0.6 to 34 wt %, preferably 1 to 27 wt %, of the kind obtainable conventionally by alkoxylation of suitable starter molecules. To prepare these polyether polyols it is possible to use as starter molecules any desired polyhydric alcohols, examples being those from the molecular weight range of 62 to 400, of the kind described above with regard to the preparation of polyester polyols.

Alkylene oxides suitable for the alkoxylation reaction are especially ethylene oxide and propylene oxide, which can be used in the alkoxylation reaction in any sequence or else in a mixture.

Suitable polyacrylate poylols B) are, for example, those of an average molecular weight, calculable from functionality and hydroxyl number or determinable by gel permeation chromatography (GPC) of 800 to 50 000, preferably of 1000 to 20 000, having a hydroxyl group content of 0.1 to 12 wt %, preferably 1 to 10, of the kind preparable in a conventional way by copolymerization of olefinically unsaturated monomers containing hydroxyl groups with hydroxyl-group-free olefinic monomers.

Examples of suitable monomers for preparing the polyacrylate polyols B) are vinyl and vinylidene monomers such as, for example, styrene, α-methylstyrene, o- and/or p-chlorostyrene, o-, m- or p-methylstyrene, p-tert-butylstyrene, acrylic acid, acrylonitrile, methacrylonitrile, acrylic and methacrylic esters of alcohols having up to 18 carbon atoms, such as methyl acrylate, ethyl acrylate, n-propyl acrylate, isopropyl acrylate, n-butyl acrylate, isobutyl acrylate, tert-butyl acrylate, amyl acrylate, hexyl acrylate, 2-ethylhexyl acrylate, isooctyl acrylate, 3,3,5-trimethylhexyl acrylate, stearyl acrylate, lauryl acrylate, cyclopentyl acrylate, cyclohexyl acrylate, 4-tert-butylcyclohexyl acrylate, isobornyl acrylate, methyl methacrylate, ethyl methacrylate, n-propyl methacrylate, isopropyl methacrylate, butyl methacrylate, isobutyl methacrylate, tert-butyl methacrylate, amyl methacrylate, hexyl methacrylate, 2-ethylhexyl methacrylate, isooctyl methacrylate, 3,3,5-trimethylhexyl methacrylate, stearyl methacrylate, lauryl methacrylate, cyclopentyl methacrylate, cyclohexyl methacrylate, 4-tert-butylcyclohexyl methacrylate, norbornyl methacrylate or isobornyl methacrylate, diesters of fumaric acid, itaconic acid or maleic acid with alcohols having 4 to 8 carbon atoms, acrylamide, methacrylamide, vinyl esters of alkanemonocarboxylic acids having 2 to 5 carbon atoms, such as vinyl acetate or vinyl propionate, hydroxyalkyl esters of acrylic acid or methacrylic acid having 2 to 5 carbon atoms in the hydroxyalkyl radical, such as 2-hydroxyethyl, 2-hydroxypropyl, 3-hydroxypropyl, 3-hydroxybutyl, 4-hydroxybutyl, trimethylolpropane monoacrylate or monomethacrylate or pentaerythritol monoacrylate or monomethacrylate, and also any desired mixtures of such exemplified monomers.

Preferred binder components B) are polyester polyols, polycarbonate polyols and/or polyacrylate polyols of the type stated. Particularly preferred binder components B) are polyacrylate polyols of the type stated, which may optionally be used in a mixture with polyester polyols and/or polycarbonate polyols of the type stated. With very particular preference the binder components B) contain exclusively polyacrylate polyols of the type stated.

The coating compositions of the invention comprise at least one catalyst C) for the crosslinking of silane groups. Catalysts of this kind are any compounds which are capable of accelerating the hydrolysis and condensation of alkoxysilane groups or, preferably, the thermally induced silane condensation.

Examples of suitable catalysts C) are acids, such as organic carboxylic acids, sulfuric acid, p-toluenesulfonic acid, trifluoromethanesulfonic acid, dodecylbenzenesulfonic acid, acetic acid, trifluoroacetic acid, phosphoric monoesters and phosphoric diesters, such as dibutyl phosphate, 2-ethylhexyl phosphate, phenyl phosphate and bis(2-ethylhexyl) phosphate, and also phosphonic diesters and diphosphonic diesters, as described in WO 2007/033786, for example.

Likewise suitable as catalysts C) are also bases, such as the N-substituted amidines 1,5-diazabicyclo[4.3.0]non-5-ene (DBN) and 1,5-diazabicyclo[5.4.0]undec-7-ene (DBU), or else metal salts and metal chelates, such as tetraisopropyl titanate, tetrabutyl titanate, titanium(IV) acetylacetonate, aluminum tri-sec-butoxide, aluminum acetylacetonate, aluminum triflate, tin triflate or zirconium ethylacetoacetate, as described in WO 2006/042658, for example.

Other suitable catalysts C) are phosphoric esters and phosphonic esters of the type stated above that are present in the form blocked with amines, preferably with tertiary amines. Particularly preferred catalysts of this type are those which release the acidic phosphoric and phosphonic esters again in the temperature range of the curing of automotive topcoats and clearcoats, as for example in the range from 100 to 150° C., with elimination of the blocking amine, said esters representing the actually active catalysts. Suitable amine-blocked phosphoric acid catalysts C) are described in WO 2008/074489 and WO 2009/077180, for example.

Likewise suitable catalysts C) are organic sulfonic acids of the type stated above which are used in blocked form, for example in amine-neutralized form, or as adduct with epoxides, as described in DE 2 356 768 B1, and which release the catalytic sulfonic acids again above 100° C.

Further catalysts C) suitable for the crosslinking of silane groups are also tetraalkylammonium carboxylates, such as, for example, tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and/or tetrabutylammonium benzoate. Catalysts C) suitable for the crosslinking of silane groups are also quaternary ammonium and phosphonium polyfluorides, as known as trimerization catalysts for isocyanate groups from EP-A0 798 299, EP-A0 896 009 and EP-A0 962 455, for example.

Lastly, suitable catalysts C) are also zinc-amidine complexes, which are preparable by the process of WO 2014/016019 by reaction of one or more zinc(II) biscarboxylates with amidines.

Preferred catalysts C) for the crosslinking of silane groups are acidic phosphoric esters, phosphonic esters and sulphonic esters of the stated type, which may optionally be present in a form blocked with amines, and also tetraalkylammonium carboxylates of the stated type. Particularly preferred catalysts C) are amine-blocked phosphoric esters and sulphonic acids, and also the stated tetraalkylammonium carboxylates. Especially preferred catalysts C) are amine-blocked phenyl phosphate and bis(2-ethylhexyl) phosphate, tetraethylammonium benzoate and tetrabutylammonium benzoate.

Besides the catalysts C) identified by way of example above for silane crosslinking, the coating compositions of the invention may optionally further comprise urethanization catalysts which are customary in isocyanate chemistry and which accelerate the reaction of the isocyanate groups in component A) with the hydroxyl groups in the binder component B), examples of such catalysts being tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron(III) chloride, zinc chloride, zinc 2-ethylcaproate, tin(II) octanoate, tin(II) ethylcaproate, dibutyltin(IV) dilaurate, zirconium(IV) isopropoxide, zirconium(IV) n-butoxide, zirconium(IV) 2-ethylhexanoate, zirconyl octanoate, bismuth(III) 2-ethylhexanoate, bismuth (III) octoate or molybdenum glycolate.

The catalysts C) are employed in the coating compositions of the invention as individual substances or in the form of any desired mixtures with one another in amounts of 0.005 wt % up to 5 wt %, preferably of 0.005 wt % up to 2 wt %, more preferably of 0.005 wt % up to 1 wt %, calculated as the sum total of all catalysts C) used, and based on the total amount of polyisocyanate component A) and hydroxy-functional binder component B).

The coating compositions of the invention may optionally comprise further auxiliaries and additives D). These are, in particular, the auxiliaries and additives known to the skilled person from coatings technology, such as, for example, solvents, UV stabilizers, antioxidants, water scavengers, flow control agents, rheological additives, slip additives, defoamers, fillers and/or pigments.

In order to reduce the processing viscosity, the coating compositions of the invention may be diluted with customary organic solvents $D_1$), for example. Solvents suitable for this purpose are, for example, the paint solvents already described above as solvents for optional accompanying use in the preparation of the thioallophanates containing silane groups, these solvents behaving chemically inertly toward the reactive groups of the coating composition constituents, and having a water content of not more than 1.0 wt %, more preferably not more than 0.5 wt %, based on solvent employed.

Suitable UV stabilizers $D_2$) may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl) phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4 butoxybenzylidenemalonate. These preferred UV stabilizers may be employed either singly or in any desired combinations with one another.

Optionally, one or more of the exemplified UV stabilizers $D_2$) are added to the coating composition of the invention, preferably in amounts of 0.001 to 3.0 wt %, more preferably 0.01 to 2 wt %, calculated as total amount of UV stabilizers used, based on the total amount of polyisocyanate component A) and hydroxy-functional binder component B).

Suitable antioxidants $D_3$) are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. These may be used either individually or in any desired combinations with one another as required.

These antioxidants $D_3$) are preferably used in amounts of 0.01 to 3.0%, more preferably 0.02% to 2.0%, calculated as the total amount of antioxidants used, based on the total amount of polyisocyanate composition A) and hydroxy-functional binder component B).

In order to prevent premature crosslinking of silane groups in the coating compositions of the invention, there may be advantage to adding water scavengers $D_4$), examples being orthoformic esters, such as triethyl orthoformate, or vinylsilanes, such as vinyltrimethoxysilane. These water scavengers are employed, if at all, in amounts of 0.01 wt % up to 5 wt %, preferably of 0.01 wt % up to 2 wt %, based on the total amount of polyisocyanate component A) and hydroxy-functional binder component B).

In order to improve the substrate wetting, the coating compositions of the invention may optionally comprise suitable flow control agents $D_5$), examples being organically modified siloxanes, such as polyether-modified siloxanes, polyacrylates and/or fluorosurfactants. These flow control agents are employed, if at all, in amounts of 0.01 wt % up to 3 wt %, preferably of 0.01 wt % up to 2 wt %, more preferably of 0.05 to 1.5 wt %, based on the total amount of polyisocyanate component A) and hydroxy-functional binder component B).

The rheological additives, slip additives, defoamers, fillers and/or pigments which are likewise optionally present in the coating compositions of the invention as further auxiliaries and additives D) are known to the skilled person and are employed, if at all, in amounts customary within coatings technology. A comprehensive overview of such suitable auxiliaries and additives is found for example in Bodo Müller, "Additive kompakt", Vincentz Network GmbH & Co KG (2009).

To produce the coating compositions of the invention, the above-described components A), B), C) and optionally D) are intimately mixed in any order in succession or together, preferably by means of suitable mixing assemblies, until a homogeneous solution is present. Here, the polyisocyanate component A) which comprises at least one thioallophanate polyisocyanate containing silane groups, and the hydroxy-functional binder component B), are customarily employed in amounts such that for each isocyanate group in the polyisocyanate component A) there are 0.5 to 3.0, preferably 0.6 to 2.0, more preferably 0.8 to 1.6 hydroxyl groups of the binder component B).

The catalyst component C) and also the further auxiliaries and additives D) for optional accompanying use may be added here, optionally even before the actual mixing of the reactive components, either to the polyisocyanate component A) and/or to the binder component B), in which case the catalyst component C) is added, with particular preference, to the binder component B) in order to avoid a premature silane condensation.

The coating compositions of the invention obtained accordingly, comprising thioallophanate polyisocyanates containing silane groups as crosslinking agents, may be applied by methods known per se, as for example by spraying, spreading, dipping, flow-coating, or with the aid of rollers or knife coaters, in one or more layers.

Substrates contemplated here are any desired substrates, such as metal, wood, glass, stone, ceramic materials, concrete, rigid and flexible plastics, textiles, leather and paper, which prior to coating may optionally also be provided with customary primers, known priming systems, surfacer coatings, basecoat systems and/or clearcoat systems.

The coating compositions of the invention find use preferably in areas of application where a coating is subject to exacting requirements in terms of optical quality and resistance toward mechanical scratching. These include, in particular, decorative, protective and/or effect-imparting coatings and paint systems of high scratch resistance on motor vehicle bodies, such as, for example, motorcycles, buses, trucks or automobiles, or on parts thereof. The coating compositions of the invention are especially suitable for producing coatings and paint systems, particularly clearcoats, in automotive refinishing and also in automotive OEM finishing.

Here, the coating compositions of the invention are preferably also used in the clearcoat or topcoat layer of multicoat systems, particularly in the context of multistage coating methods, wherein first a pigmented basecoat layer and thereafter a layer of the coating composition of the invention are applied to an optionally precoated substrate.

A further embodiment of the present invention relates to a method for the coating of surfaces, comprising the steps of
a) applying the coating composition to a substrate; and
b) curing the coating composition.

The coating compositions of the invention are processed preferably by spray application methods, such as, for example, compressed air spraying, airless spraying, high-speed rotation, electrostatic spray application (ESTA), optionally in conjunction with hot spray applications such as hot air spraying, for example. The individual constituents of the coating compositions of the invention, particularly the components A) and B) that are reactive with one another, are preferably not mixed in these spray application activities until immediately prior to processing; mixing may take place advantageously in so-called two-component units.

The coating compositions of the invention may be cured immediately following application or after a certain flash-off time has been observed. The flash-off term serves, for example, for the leveling and for the degassing of the coating films, or for the evaporation of volatile constituents, such as solvents, for example. The required duration of the flash-off time may be controlled in a targeted way by means, for example, of application of elevated temperatures and/or by means of a reduced atmospheric humidity.

The ultimate curing of the applied coating compositions of the invention takes place, finally, by customary and known methods, such as heating in a forced-air oven, irradiation with IR lamps or near infrared (NIR radiation), preferably in a temperature range from 30 to 200° C., more preferably 40 to 190° C. and very preferably 50 to 180° C., for a time of 1 min up to 12 h, more preferably 2 min up to 6 h and very preferably 3 min up to 4 h.

The method is preferably employed for the coating of surfaces in the fields of application stated earlier on above.

The coatings produced in this way from the coating compositions of the invention, these coatings preferably constituting clearcoats, are notable for extraordinarily high scratch resistance and also for very good solvent and chemical resistance.

In a further embodiment, the present invention relates to the use of the above-described coating compositions of the invention for producing coatings and paint systems.

Said coatings and paint systems are preferably used for producing clearcoats.

Particularly preferred is the use of the coating compositions of the invention for producing coatings and paint systems in automotive refinishing and in automotive OEM finishing.

A further embodiment of the present invention relates to substrates coated with one or more coating compositions of the invention.

The substrate is preferably selected from the group consisting of metal, wood, woodbase materials, glass, stone, ceramic materials, mineral building materials, rigid and flexible plastics, textiles, leather and paper.

The examples which follow serve to illustrate the invention. They are not intended to restrict in any way the scope of protection of the claims.

EXAMPLES

All percentages are based on weight unless otherwise noted.

The NCO contents were determined by titrimetry in accordance with DIN EN ISO 11909.

The residual monomer contents were measured in accordance with DIN EN ISO 10283 by gas chromatography with an internal standard.

All the viscosity measurements were made with a Physica MCR 51 rheometer from Anton Paar Germany GmbH (Germany) to DIN EN ISO 3219.

The Hazen color numbers were examined on a LICO 400 colorimeter from Hach Lange GmbH, Düsseldorf.

The amounts (mol %) of the isocyanate follow-on products—thiourethane, thioallophanate and isocyanurate—produced during the preparation of the thioallophanates containing silane groups (starting compounds A)) were computed from the integrals of proton-decoupled 13C NMR spectra (recorded on a Bruker DPX-400 instrument), and they relate in each case to the sum of thiourethane, thioallophanate and isocyanurate groups present. The individual structural elements have the following chemical shifts (in ppm): Thiourethane: 166.8; thioallophanate: 172.3 and 152.8; isocyanurate: 148.4.

The gloss of the coatings obtained was measured by reflectometry to DIN EN ISO 2813 at the 20° angle.

The pendulum damping according to König was determined to DIN EN ISO 1522 on glass plates.

To test the coatings for solvent resistance, small amounts of each of the solvents xylene, 1-methoxypropyl-2-acetate, ethyl acetate and acetone were placed in test tubes and provided with a cottonwool pad at the opening, thus forming a solvent-saturated atmosphere within the test tubes. The test tubes were subsequently brought with the cotton pad onto the surface of the coating, where they remained for 5 minutes. After the solvent had been wiped off, the film was examined for destruction/softening/loss of adhesion and rated (0=no change, 5=film completely dissolved). The evaluations reported are those for the four solvents in the order in each case of xylene (X), 1-methoxypropyl-2-acetate (MPA), ethyl acetate (EA) and acetone (A) in the form of four successive digits.

The wet scratch resistance of the coatings was tested by means of a laboratory washing unit according to DIN EN ISO 20566. The figure reported is the loss of gloss in Gloss Units (GU) after scratching (10 cycles). The lower the loss of gloss in GU, the more resistant the coating is toward wet scratching.

The resistance to dry scratching was tested by means of a so-called hammer test. In this test, a hammer (weight: 800 g without shaft), covered on its flat side with polishing paper or 00 steel wool, was cautiously placed onto the coated surface at right angles and was guided over the coating in a trace without tipping and without additional physical force. 10 back-and-forth strokes were executed in each case. After exposure to the scratching medium, the test area was cleaned with a soft cloth and then the gloss was measured transverse to the direction of scratching at three different locations. The lower the loss of gloss in GU, calculated from the average of these measurements, the more resistant the coating is toward wet scratching.

Preparation of the Starting Compounds
Polyisocyanate Component A1)

1008 g (6 mol) of hexamethylene diisocyanate (HDI) were introduced under dry nitrogen with stirring at a temperature of 80° C. and 196 g (1.0 mol) of mercaptopropyltrimethoxysilane were added over the course of 30 minutes. The reaction mixture was stirred further at 80° C. until, after about 6 hours, the NCO content of 38.4%, corresponding to complete thiourethanization, had been reached.

At this point in time, a sample was taken from the reaction mixture, and its composition determined by $^{13}$C-NMR spectroscopy. According to this determination, thiourethane groups were present exclusively. The $^{13}$C-NMR spectrum showed no signals of thioallophanate groups or isocyanurate groups.

Addition of 0.1 g of zinc(II) 2-ethyl-1-hexanoate as catalyst to the reaction mixture, which was at a temperature of 80° C., initiated the thioallophanatization reaction, the temperature rising to up to 85° C. because of the exothermic reaction. Stirring continued at 85° C. until, about an hour after addition of the catalyst, the NCO content had dropped to 34.9%. The reaction was stopped by addition of 0.1 g of orthophosphoric acid and the unreacted monomeric HDI was removed in a thin-film evaporator at a temperature of 130° C. and a pressure of 0.1 mbar. This gave 538 g of a virtually colorless, clear polyisocyanate mixture whose characteristics and composition were as follows:
   NCO content: 14.4%
   Monomeric HDI: 0.08%
   Viscosity (23° C.): 291 mPas
   Thiourethane: 0.0 mol %
   Thioallophanate: 91.2 mol %
   Isocyanurate groups: 8.8 mol %
Polyisocyanate Component A2)

1008 g (6 mol) of hexamethylene diisocyanate (HDI) were introduced under dry nitrogen with stirring at a temperature of 80° C. and 0.1 g of zinc(II) 2-ethyl-1-hexanoate as catalyst were added. Over a period of about 30 minutes, 196 g (1.0 mol) of mercaptopropyltrimethoxysilane were added dropwise, with the temperature of the mixture rising to up to 85° C. owing to the exothermic reaction. The reaction mixture was stirred further at 85° C. until, after about 2 hours, the NCO content had dropped to 34.9%. The catalyst was deactivated by addition of 0.1 g of orthophosphoric acid and the unreacted monomeric HDI was removed in a thin-film evaporator at a temperature of 130° C. and a pressure of 0.1 mbar. This gave 523 g of a virtually colorless, clear polyisocyanate mixture, whose characteristics and composition were as follows:

NCO content: 14.2%
Monomeric HDI: 0.05%
Viscosity (23° C.): 249 mPas
Thiourethane: 0.0 mol %
Thioallophanate: 98.5 mol %
Isocyanurate groups: 1.5 mol %

Polyisocyanate Component A3)

By the process described for polyisocyanate component B 2), 1344 g (8 mol) of HDI were reacted with 196 g (1.0 mol) of mercaptopropyltrimethoxysilane in the presence of 0.15 g of zinc(II) 2-ethyl-1-hexanoate at a temperature of 85° C. to a NCO content of 38.2%. After the reaction had been stopped with 0.15 g of orthophosphoric acid and the reaction mixture had been worked up by distillation in a thin-film evaporator, 528 g were obtained of a virtually colorless, clear polyisocyanate mixture, whose characteristics and composition were as follows:

NCO content: 15.2%
Monomeric HDI: 0.12%
Viscosity (23° C.): 209 mPas
Thiourethane: 0.0 mol %
Thioallophanate: 99.0 mol %
Isocyanurate groups: 1.0 mol %

Polyisocyanate Component A4)

By the process described for polyisocyanate component B 2), 672 g (4 mol) of HDI were reacted with 196 g (1.0 mol) of mercaptopropyltrimethoxysilane in the presence of 0.1 g of zinc(II) 2-ethyl-1-hexanoate at a temperature of 85° C. to a NCO content of 29.0%. After the reaction had been stopped with 0.1 g of orthophosphoric acid and the reaction mixture had been worked up by distillation in a thin-film evaporator, 486 g were obtained of a virtually colorless, clear polyisocyanate mixture, whose characteristics and composition were as follows:

NCO content: 12.9%
Monomeric HDI: 0.06%
Viscosity (23° C.): 298 mPas
Thiourethane: 0.0 mol %
Thioallophanate: 98.3 mol %
Isocyanurate groups: 1.7 mol %

Polyisocyanate Component A5)

By the process described for polyisocyanate component B 2), 756 g (4.5 mol) of HDI were reacted with 294 g (1.5 mol) of mercaptopropyltriethoxysilane in the presence of 0.1 g of zinc(II) 2-ethyl-1-hexanoate at a temperature of 85° C. to a NCO content of 24.0%. After the reaction had been stopped with 0.1 g of orthophosphoric acid and the reaction mixture had been worked up by distillation in a thin-film evaporator, 693 g were obtained of a virtually colorless, clear polyisocyanate mixture, whose characteristics and composition were as follows:

NCO content: 11.8%
Monomeric HDI: 0.06%
Viscosity (23° C.): 452 mPas
Thiourethane: 0.0 mol %
Thioallophanate: 99.0 mol %
Isocyanurate groups: 1.0 mol %
Si content (calculated): 6.1%

Polyisocyanate Component A6)

By the process described for polyisocyanate component B 2), 756 g (4.5 mol) of HDI were reacted with 357 g (1.5 mol) of mercaptopropyltriethoxysilane in the presence of 0.1 g of zinc(II) 2-ethyl-1-hexanoate at a temperature of 85° C. to a NCO content of 22.6%. After the reaction had been stopped with 0.1 g of orthophosphoric acid and the reaction mixture had been worked up by distillation in a thin-film evaporator, 715 g were obtained of a virtually colorless, clear polyisocyanate mixture, whose characteristics and composition were as follows:

NCO content: 11.3%
Monomeric HDI: 0.21%
Viscosity (23° C.): 267 mPas
Thiourethane: 0.0 mol %
Thioallophanate: 98.4 mol %
Isocyanurate groups: 1.6 mol %

Polyisocyanate Component A7)

504 g (3.0 mol) of HDI were introduced under dry nitrogen with stirring at a temperature of 80° C. and 588 g (3.0 mol) of mercaptopropyltrimethoxysilane were added over the course of 30 minutes. The reaction mixture was stirred further at 80° C. until, after about 12 hours, the NCO content of 11.5%, corresponding to complete thiourethanization, had been reached. 0.1 g of zinc(II) 2-ethyl-1-hexanoate was added as catalyst to the reaction mixture, which was at 80° C., whereupon the temperature rose to up to 85° C. owing to the exothermic thioallophanatization reaction. The mixture was stirred further at 85° C. until, about 4 hours after addition of catalyst, the NCO content had dropped to 3.0%. The reaction was then stopped by addition of 0.1 g of orthophosphoric acid. This gave a virtually colorless, clear polyisocyanate mixture, whose characteristics and composition were as follows:

NCO content: 3.0%
Monomeric HDI: 0.69%
Viscosity (23° C.): 9220 mPas
Thiourethane: 23.2 mol %
Thioallophanate: 66.6 mol %
Isocyanurate groups: 10.2 mol %

Polyisocyanate Component A8)

1332 g (6 mol) of isophorone diisocyanate (IPDI) were introduced under dry nitrogen with stirring at a temperature of 95° C. and 0.2 g of zinc(II) 2-ethyl-1-hexanoate as catalyst was added. Over a period of about 30 minutes, 196 g (1.0 mol) of mercaptopropyltrimethoxysilane were added dropwise, with the temperature of the mixture rising to up to 103° C. owing to the exothermic reaction. The reaction mixture was stirred further at 100° C. until, after about 5 hours, the NCO content had dropped to 27.4%. The catalyst was deactivated by addition of 0.2 g of orthophosphoric acid, and the unreacted monomeric IPDI was removed in a thin-film evaporator at a temperature of 160° C. and a pressure of 0.1 mbar. This gave 659 g of a clear, pale yellow polyisocyanate mixture, whose characteristics and composition were as follows:

NCO content: 11.6%
Monomeric IPDI: 0.46%
Viscosity (23° C.): 11 885 mPas
Thiourethane: 1.3 mol %
Thioallophanate: 93.4 mol %
Isocyanurate groups: 4.3 mol %

Polyisocyanate Component A9)

Added dropwise to 756 g (4.5 mol) of HDI, under dry nitrogen and with stirring at a temperature of 80° C., were 196 g (1.0 mol) of mercaptopropyltrimethoxysilane, over a period of approximately 30 minutes. The reaction mixture was subsequently heated to 140° C. and stirred further until after about 5 hours the NCO content had dropped to 24.0%. Working up by distillation in a thin-film evaporator gave 685 g of a virtually colorless, clear polyisocyanate mixture, whose characteristics and composition were as follows:

NCO content: 11.8%
Monomeric HDI: 0.08%
Viscosity (23° C.): 447 mPas
Thiourethane: 0.0 mol %
Thioallophanate: 98.6 mol %
Isocyanurate groups: 1.4 mol %

Polyisocyanate Components A10)-A13) and Comparative Polyisocyanate C1)

80 parts by weight of a low-monomer-content polyisocyanurate polyisocyanate based on HDI, with an NCO content of 21.6%, an average isocyanate functionality of 3.5 and a viscosity (23° C.) of 3200 mPas, were admixed with 20 parts by weight of the thioallophanate polyisocyanate A5) and homogenized by 30 minutes of stirring at 60° C. to give a silane-functional polyisocyanate mixture A10). Using the same method, and employing the amounts of the same starting components as listed in table 1 below, the silane-functional polyisocyanate mixtures A11) to A13) were produced.

For comparison, based on example 1 of WO 2009/156148, by solvent-free reaction of 79 parts by weight of the above-described, low-monomer-content polyisocyanurate polyisocyanate based on HDI (NCO content: 21.6%; average NCO functionality: 3.5; viscosity (23° C.): 3200 mPas) with 21 parts by weight of mercaptopropyltrimethoxysilane in the presence of 500 ppm of dibutyltin dilaurate as catalyst at 60° C., a partially silanized HDI trimer (comparative polyisocyanate C1) was prepared.

Table 1 below shows compositions (parts by weight) and characteristic data for the silane-functional polyisocyanate mixtures A10) to A13), and also the characteristic data for comparative polyisocyanate C1) according to WO 2009/156148.

TABLE 1

| Polyisocyanate | A10) | A11) | A12) | A13) | C1) |
|---|---|---|---|---|---|
| HDI polyisocyanurate | 80 | 70 | 60 | 50 | — |
| Polyisocyanate A5) | 20 | 30 | 40 | 50 | — |
| NCO content [%] | 19.6 | 18.7 | 17.6 | 16.7 | 12.6 |
| Viscosity (23° C.) [mPas] | 2240 | 1820 | 1490 | 1210 | 11800 |
| Average NCO functionality | 3.2 | 3.1 | 2.9 | 2.8 | 2.6 |

A direct comparison of the silane-functional polyisocyanate mixture A13) with the comparative polyisocyanate C1) according to WO 2009/156148, both having a silane group content (calculated as —Si(OCH$_3$)$_3$; mol. weight=121 g/mol) of 13%, impressively demonstrates the distinct advantage of the silane-functional thioallophanate polyisocyanates in terms of isocyanate content, isocyanate functionality and viscosity relative to the existing state of the art.

Comparative Polyisocyanate C2)

Based on a working example in WO 2012/168079 (curing agent system VB2-1), reaction of 100 parts by weight of the above-described, low-monomer-content polyisocyanurate polyisocyanate based on HDI (NCO content: 21.6%; average NCO functionality: 3.5; viscosity (23° C.): 3200 mPas) with a mixture of 30 parts by weight of bis-[3-(trimethoxysilyl)propyl]amine and 21 parts by weight of N-[3-(trimethoxysilyl)propyl]butylamine in 84 parts by weight of butyl acetate at 50° C. was used to prepare a partially silanized HDI trimer. After a reaction time of approximately four hours, the characteristics found for the present solution were as follows:

NCO content: 6.0%
Average NCO functionality: 2.3
Solids content: 64%
Viscosity (23° C.): 70 mPas
Si content (calculated): 4.1%

Examples 1-4 (Inventive and Comparison, Automotive Clearcoat)

To produce an inventive coating composition, 44.60 parts by weight of a commercial polyacrylate polyol (Setalux 1774 SS-65; from Nuplex Resins, Bitterfeld-Wolfen, Germany) having a solids content of 65 wt % and an OH number (based on solids) of 165 mg KOH/g, corresponding to an equivalent weight of 340 g/eq OH, were mixed homogeneously with 0.6 part by weight of a 10% strength solution of a commercial flow control additive in butyl acetate (BYK 331; BYK-Chemie GmbH, Wesel, Germany) and with 6.0 parts by weight of a 10% strength solution of tetrabutylbenzoate (TBAB) in MPA at room temperature by intensive stirring. Then 30.35 parts by weight of the thioallophanate containing silane groups, A5), corresponding to an equivalents ratio of isocyanate groups to hydroxyl groups of 1:1, were incorporated as crosslinker component with stirring, and the solids content of the complete coating composition was adjusted to 60% using a 1:1 mixture of MAP and solvent naphtha 100.

Using the same method, coating compositions (inventive and comparative) were produced from Setalux 1774 SS-65, employing the polyisocyanates A13), C2) and also the low-monomer-content HDI polyisocyanurate polyisocyanate on which C2) is based, and these compositions were likewise adjusted to a solids content of 60%. In the case of example 4 (binder free of silane groups), the accompanying use of the catalyst was omitted.

To determine the pendulum damping and to test the solvent resistance, the coating compositions were each applied to glass plates in an application film thickness of 50 μm by means of a bar-type paint applicator, and were flashed off at room temperature for 10 minutes and then cured at 140° C. over the course of 30 minutes.

The scratch resistance was tested on complete multicoat OEM paint systems. For this purpose, the inventive coating compositions and comparative coatings were applied as clearcoats to aluminum panels in an application film thickness of 50 μm, using a bar-type paint applicator, the panels having been coated beforehand with a commercial 1K OEM waterborne primer-surfacer and with a conventional black 1K OEM waterborne basecoat. While the waterborne primer-surfacer was cured fully by baking at 165° C. over the course of 20 minutes, the waterborne basecoat was merely subjected to preliminary drying at 80° C. for 10 minutes. Following the application of the clearcoats, the basecoat film and the clearcoat film were cured together at 140° C. over the course of 30 minutes.

Table 2 below shows the constitutions of the coating compositions in parts by weight and also the results of the performance tests in comparison, in each case after a storage time of 24 h at 23° C. and also after 16 hours of further conditioning at 60° C.

TABLE 2

| Formulation | Example 1 | Example 2 | Example 3 (comparative) | Example 4 (comparative) |
|---|---|---|---|---|
| Setalux 1774 SS-65, asf. | 44.60 | 52.48 | 39.38 | 58.63 |
| Polyisocyanate A5) | 30.35 | — | — | — |
| Polyisocyanate A13) | — | 25.23 | — | — |
| Comparative polyisocyanate C2) | — | — | 52.72 | — |
| HDI-polyisocyanurate polyisocyanate | — | — | — | 21.81 |
| Byk 331, 10% in BA | 0.60 | 0.60 | 0.60 | 0.60 |
| TBAB, 10% in MPA | 6.00 | 6.00 | 6.00 | — |
| MPA/SN 100 (1:1) | 18.45 | 15.69 | 1.30 | 18.96 |
| Total parts by weight | 100.00 | 100.00 | 100.00 | 100.00 |
| Solids content | 60.0% | 60.0% | 60.0% | 60.0% |
| Si content based on binder, resin solids | 3.1% | 1.5% | 3.6% | — |
| Si content based on coating material | 1.8% | 0.9% | 2.2% | — |
| initial gloss (20°) | 89.2 | 89.4 | 88.9 | 89.1 |
| Pendulum damping 24 h/23° C. | 192 s | 201 s | 215 s | 212 s |
| Pendulum damping 16 h/60° C. | 192 s | 196 s | 200 s | 212 s |
| Solvent resistance (X, MPA, EA, A) 24 h/23° C. | 0, 0, 1, 2 | 0, 0, 1, 4 | 0, 0, 0, 1 | 1, 1, 4, 4 |
| Solvent resistance (X, MPA, EA, A) 16 h/60° C. | 0, 0, 1, 2 | 0, 0, 1, 2 | 0, 0, 0, 1 | 1, 0, 2, 4 |
| Wet scratch resistance 24 h/23° C. | 15 GU | 18 GU | 16 GU | 33 GU |
| Wet scratch resistance 16 h/60° C. | 16 GU | 20 GU | 17 GU | 33 GU |
| Dry scratch resistance with polishing paper 24 h/23° C. | 8 GU | 22 GU | 14 GU | 54 GU |
| Dry scratch resistance with polishing paper 16 h/60° C. | 13 GU | 23 GU | 13 GU | 53 GU |
| Dry scratch resistance with steel wool 24 h/23° C. | 3 GU | 8 GU | 3 GU | 50 GU |
| Dry scratch resistance with steel wool 16 h/60° C. | 3 GU | 12 GU | 3 GU | 50 GU |

As the results set out in table 2 show, the inventive coating compositions (examples 1 and 2), produced using the new thioallophanate polyisocyanates containing silane groups, lead to hard, highly glossy coatings which relative to the silane-group-free comparative coating material (example 4) are notable for very good solvent resistances and outstanding scratch resistances.

At the same time, the inventive coating from example 1 once again exhibits significant improvements in terms of wet and dry scratch resistance over the coating produced using the silane-modified comparative polyisocyanate of the prior art (example 3) as well.

The invention claimed is:

1. A nonaqueous coating composition comprising

A) at least one polyisocyanate component,

B) at least one hydroxy-functional binder component,

C) at least one catalyst for the crosslinking of silane groups, and

D) optionally further auxiliaries and additives, where the polyisocyanate component A) comprises at least one thioallophanate containing silane groups, of the general formula (I),

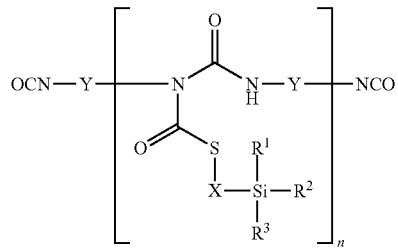

in which $R^1$, $R^2$ and $R^3$ are identical or different radicals and are each a saturated, linear or branched, aliphatic or cycloaliphatic radical having up to 6 carbon atoms, and optionally contain up to 3 oxygen atoms, X is a linear or branched organic radical having 2 to 10 carbon atoms, Y is a linear or branched, aliphatic or cycloaliphatic, an araliphatic or aromatic radical having up to 18 carbon atoms and n is an integer from 1 to 20.

2. The coating composition as claimed in claim 1, characterized in that the polyisocyanate component A) comprises at least one thioallophanate containing silane groups, of the formula (I), in which $R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is such an alkoxy radical, and X is a propylene radical (—$CH_2$—$CH_2$—$CH_2$—), Y and n have the definition stated in claim 1.

3. The coating composition as claimed in claim 1, characterized in that the polyisocyanate component A) comprises at least one thioallophanate containing silane groups, of the formula (I), in which $R^1$, $R^2$ and $R^3$ are identical or different radicals and are each methyl, methoxy or ethoxy, with the proviso that at least one of the radicals $R^1$, $R^2$ and $R^3$ is a methoxy or ethoxy radical, X is a propylene radical (—$CH_2$—$CH_2$—$CH_2$—), and Y and n have the definition stated in claim 1.

4. The coating composition as claimed in claim 1, characterized in that the polyisocyanate component A) comprises at least one thioallophanate containing silane groups, of the formula (I), in which Y is a linear or branched, aliphatic or cycloaliphatic radical having 5 to 13 carbon atoms.

5. The coating composition as claimed in claim 1, characterized in that the polyisocyanate component A) comprises at least one thioallophanate containing silane groups, of the formula (I), in which Y is an aliphatic and/or cycloaliphatic radical as obtained by removing the isocyanate groups from a diisocyanate selected from the group consisting of 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane.

6. The coating composition as claimed in claim 1, characterized in that the hydroxy-functional binder component B) comprises at least one polyester polyol, polyether polyol, polycarbonate polyol and/or polyacrylate polyol.

7. The coating composition as claimed in claim 6, characterized in that the hydroxy-functional binder component B) comprises at least one polyacrylate polyol optionally present in a mixture with polyester polyols and/or polycarbonate polyols.

8. The coating composition as claimed in claim 1, characterized in that the catalyst component C) comprises at least one acidic phosphoric ester, phosphonic ester and/or a sulfonic acid, which may optionally be present in amine-blocked form, and/or at least one tetraalkylammonium carboxylate.

9. The coating composition as claimed in claim 8, characterized in that the catalysts C) are employed as individual substances or in the form of any desired mixtures with one another in amounts of 0.005 wt % up to 5 wt %, calculated as the sum total of all catalysts C) used, based on the total amount of polyisocyanate component A) and hydroxy-functional binder component B).

10. A method for producing the coating composition as claimed in claim 1 comprising mixing components A), B), C) and optionally D) in any order in succession or together in proportions such that for each isocyanate group in the polyisocyanate component A) there are 0.5 to 3.0 hydroxyl groups of the binder component B).

11. A method for producing coatings comprising curing the coating composition as claimed in claim 1.

12. The method as claimed in claim 11 for producing clearcoats in automotive refinishing and automotive OEM finishing.

13. The method as claimed in claim 11, characterized in that the coating composition is cured in a temperature range from 30 to 200° C.

14. A substrate coated with the coating composition as claimed in claim 1.

15. The coating composition as claimed in claim 1, wherein the polyisocyanate component A) comprises at least one thioallophanate containing silane groups, of the formula (I), in which Y is an aliphatic and/or cycloaliphatic radical as obtained by removing the isocyanate groups from a diisocyanate selected from the group consisting of 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane;

the hydroxy-functional binder component B) comprises at least one polyester polyol, polyether polyol, polycarbonate polyol and/or polyacrylate polyol; and the catalyst component C) comprises at least one acidic phosphoric ester, phosphonic ester and/or a sulfonic acid, which may optionally be present in amine-blocked form, and/or at least one tetraalkylammonium carboxylate.

\* \* \* \* \*